United States Patent [19]

Evans et al.

[11] Patent Number: 4,735,027

[45] Date of Patent: Apr. 5, 1988

[54] COATING FOR WALLBOARDS

[75] Inventors: Michael E. Evans, Granville; James R. Gleason, Newark, both of Ohio

[73] Assignee: Owens-Corning Fiberglas Corporation, Toledo, Ohio

[21] Appl. No.: 894,606

[22] Filed: Aug. 8, 1986

[51] Int. Cl.⁴ .......................... E04F 13/04; C04B 7/02
[52] U.S. Cl. ...................... 52/410; 52/443; 52/446; 106/97; 106/98
[58] Field of Search ............... 106/98, 97; 52/410, 52/443, 445, 446

[56] References Cited

U.S. PATENT DOCUMENTS

| 3,135,617 | 6/1964 | Newell | 106/98 |
| 3,806,571 | 4/1974 | Ronnmark et al. | 52/741 |
| 3,819,565 | 6/1974 | Yasima et al. | 524/5 |
| 4,033,781 | 7/1977 | Hauser et al. | 106/90 |
| 4,135,940 | 1/1979 | Peltier | 106/98 |
| 4,157,998 | 6/1979 | Berntsson et al. | 106/97 |
| 4,229,224 | 10/1980 | Dawson et al. | 106/90 |
| 4,240,840 | 12/1980 | Downing et al. | 106/93 |
| 4,287,241 | 9/1981 | Kaufmann | 427/403 |
| 4,304,704 | 12/1981 | Billings | 106/90 |
| 4,339,273 | 7/1982 | Meier et al. | 106/90 |
| 4,430,463 | 2/1984 | Mullenax | 524/5 |
| 4,441,944 | 4/1984 | Massey | 427/403 |
| 4,522,004 | 6/1985 | Evans et al. | 52/409 |
| 4,525,500 | 6/1985 | Lynn | 524/5 |
| 4,525,970 | 7/1985 | Evans | 52/454 |
| 4,590,733 | 5/1986 | Schneller et al. | 52/749 |
| 4,615,162 | 10/1986 | Evans | 52/409 |

FOREIGN PATENT DOCUMENTS

| 0743154 | 9/1966 | Canada | 106/98 |
| 2129058 | 6/1973 | Fed. Rep. of Germany | 106/97 |
| 0616251 | 7/1978 | U.S.S.R. | 106/98 |

Primary Examiner—William R. Dixon, Jr.
Assistant Examiner—Anthony J. Green
Attorney, Agent, or Firm—Ted C. Gillespie

[57] ABSTRACT

A coating for a wallboard comprises of silica sand, cement and a particulate, non-fibrous filler, where the ratio of the average sand diameter to the average filler diameter is within the range of from about 40:1 to about 20:1.

12 Claims, 1 Drawing Sheet

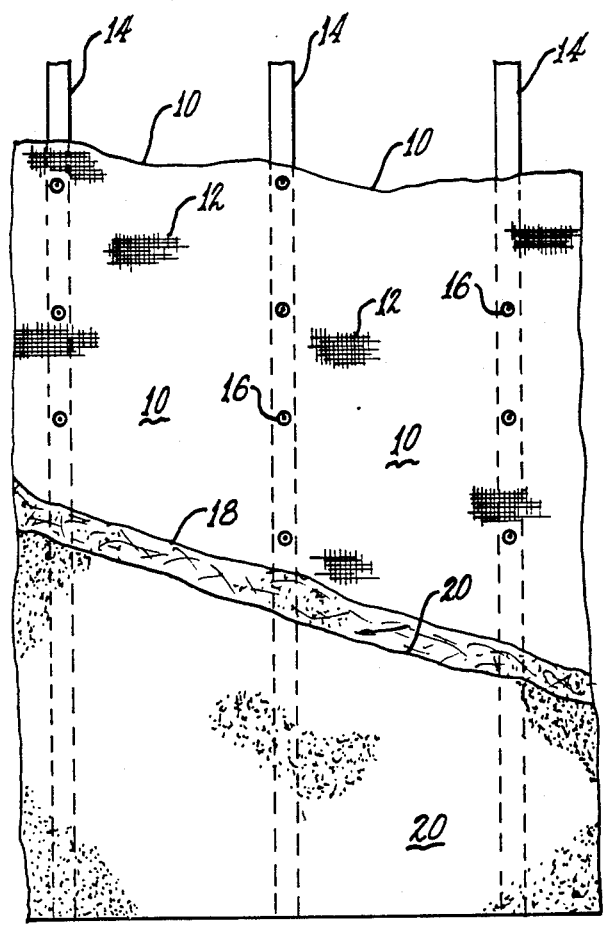

COATING FOR WALLBOARDS

TECHNICAL FIELD

This invention relates generally to coatings of the cementitious type for wall panels. More particularly, this invention relates to coatings suitable for use in an external insulation system for new buildings or existing buildings.

BACKGROUND OF THE INVENTION

A known practice in the construction industry for insulating existing walls of buildings is to add a layer of insulation board over the existing building wall and cover the insulation layer with a cementitious material to provide a suitable exterior coating with good aesthetic and weatherability properties. In this way the insulating ability of existing buildings can be cheaply and efficiently upgraded without requiring remodeling of the interior of the building. Typically, the insulation material is either a foamed insulating material, such as a urethane foam board, or a fiber glass board containing a binder. This type of wall construction can also be used for new buildings, with the boards being attached to the studs rather than to an existing wall. The coating is typically applied in two stages—a cementitious undercoat and a non-cementitious overcoat.

This construction method has some problems requiring careful attention during construction. The boards must be fastened to the existing wall, or to the studs in new construction, and this requires a mechanical fastening system. In some cases furring strips are provided for attachment of the boards. Some means is often required to help adhere the cementitious cover layer onto the insulating board. This is often accomplished with a layer of chicken wire and furring strips. In some wall constructions using fiber glass boards, the chicken wire can be eliminated by providing a fiber glass scrim material attached to the board. This allows thin layers of coating, as thin as ¼ inch or less.

A problem with most constructions using such thin coatings is that the holes, gouges, dimples made by mechanical fasteners, and joints must be filled prior to applying the cementitious coating. Thus, the typical coating process for these wall constructions begins by first sanding off the high spots, then pre-spotting the joints, holes and dimples in the board with a pre-spotting or undercoating material, then applying a full undercoat with the undercoating material and, finally, applying a final overcoat material. Sanding is often necessary to prevent application of different thicknesses of the undercoat. The pre-spotting step is necessary because typical undercoating material will shrink and crack upon drying in locations where the thickness varies, e.g., over a gouge, depression or seam, i.e. where the undercoat is necessarily applied in greater thicknesses. The pre-spotting step is time-consuming to apply and requires a time delay for drying before the undercoat is applied. An invention which improves the ability of the undercoat to the extent of eliminating the pre-spotting step, and filling low spots to be flush with the high spots would greatly improve the construction art.

STATEMENT OF THE INVENTION

Applicants have developed a coating which greatly improves the undercoating material, making it unnecessary for pre-spotting of the wall board. This improved cementitious undercoating material does not crack or shrink as it drys, even where applied in uneven thicknesses. Also, most of the need for sanding has been eliminated.

According to this invention, there is provided a coating for a wall board comprising silica sand, cement, and a particulate, non-fibrous filler, where the ratio of the average sand diameter to the average filler diameter is within the range of from about 40:1 to about 20:1. The effectiveness of a filler material of such fineness relative to the sand particles is surprising because it would be expected that the great relative particle weight differences would cause the heavier sand particles to settle out of the mixture.

In a preferred embodiment of the invention, the ratio is within the range of from about 35:1 to about 25:1.

In another preferred embodiment of the invention, the volume ratio of sand to filler is within the range of from about 2.25:1 to about 1.75:1.

In another specific embodiment of the invention, the silica sand is present to the extent of from about 25 to about 45 weight percent of dry ingredients, the filler is present to the extent of from about 10 to about 25 weight percent of the dry ingredients, and the cement is present to the extent of from about 30 to 55 weight percent of the dry ingredients.

In another preferred embodiment of the invention, acrylic solids and polypropylene fibers are present.

In a most preferred embodiment of the invention, the sand has an average diameter of about 300 microns and the filler has an average diameter of about 10 microns. The filler preferably comprises $CaCO_3$, which is a low cost, non-reactive filler. Most preferably, the sand to filler diameter ratio is about 30:1.

According to this invention, there is also provided an insulated outer wall construction for a building comprising insulation boards having a scrim secured thereto on the outer side thereof, fastening means mechanically securing the boards and the scrim to the building, and a coating covering the boards, scrim and fastening means, the coating comprising silica sand, cement and a particulate, non-fibrous filler, where the ratio of the average sand diameter to the average filler diameter is within the range of from about 40:1 to about 20:1.

In the most preferred embodiment of the invention, the wall construction includes a non-cementitious overcoat applied over the coating.

BRIEF DESCRIPTION OF THE DRAWING

The drawing is a view in elevation showing an insulated wall system constructed in accordance with the invention.

DESCRIPTION OF THE INVENTION

Wallboard 10 is covered with scrim 12 and attached to studs 14. The wallboard can be any insulation material, such as fiber glass boards having a density of about 4 pounds per cubic foot and consisting essentially of glass fibers impregnated with about 13 percent by weight of a binder, such as phenol-urea-formaldehyde resin. Other boards suitable for use with the invention include foam boards and perlite boards. Although studs are shown in the drawing, it is to be understood that the boards can be applied to any surface or framing materials such as existing walls, lath, or other structures. The primary use of such boards is in a vertical orientation such as on the walls of buildings, although it is to be understood that these wallboards can be used as wall panels in other construction locations, such as soffits, facia boards, or other architectural elements.

Although the drawing illustrates the board as being faced with a scrim, it is to be understood that the scrim is optional, and is provided to adhere the undercoat material to the board. This scrim could be eliminated entirely or replaced by a chicken wire and furring strip arrangement. In some cases the scrim is applied separately from the board by embedding the scrim into the undercoat. Typically the scrim is a fiber glass or thermoplastic scrim adhered to a fiber glass wallboard. The scrim is preferably provided with overlapping or shiplapped joints between boards, and extra reinforcement in the vicinity of the studs or joints, and also in the locations where the board will be secured to the studs.

The board is adhered to the studs by any suitable means, such as mechanical fasteners 16, which are typically provided with washers, not shown. The board can also be adhered to the building by adhesives.

After the board is in place, the coating of the invention is applied as undercoat 18 over the board. After the undercoat dries, an overcoat, such as covercoat 20 is typically applied for a final finish. The overcoat can be any suitable overcoat, several of which are commercially available.

The coating of the invention, which is shown as being applied as the undercoat in the drawing, is comprised of three basic ingredients: silica sand, cement and a particulate, non-fibrous filler. The cement can be any cement suitable for wallboard construction, such as Portland cement. The ratio of the volume of sand to the volume of filler in the coating composition is within the range of from about 2.25:1 to about 1.75:1. All volume measurements used in the specification and claims refer to bulk volume. Preferably the volume ratio is about 2:1. It has been found that the correct sizing of the filler material, along with the correct amount of filler material, have greatly improved the ability of the coating material to dry without shrinking or cracking. It is believed that the filler material must be appropriately sized to fill the interstices between the grains of sand. This eliminates voids which tend to absorb or suck up the cement during drying of the coating. Use of the filler is also advantageous in that it replaces expensive materials with a relatively cheap material.

The ratio of the average sand diameter to the average filler particle diameter is within the range of from about 40:1 to about 20:1. Preferably this ratio is within the range of about 35:1 to about 25:1, and most preferably the ratio is about 30:1. Preferably the sand particles range from 150 microns to 600 microns with a mean particle size of about 300 microns. The calcium carbonate preferably has a range of from 0.5 micron to 50 microns, with a mean particle size of about 9.5 microns.

The filler material can be any suitable material having relatively inert characteristics in the cementitious mixture, and being sized within the ratio ranges of the invention. The preferred filler is calcium carbonate, having an average diameter of about 10 microns. Calcium carbonate performs well because it has a more rounded or spherical structure in the particulate form, thereby enhancing flow into the interstices between sand particles, and because it provides improved packing. Other fillers which can be employed include wollastonite, kayolin, feldspar, silica, talc, aluminum trihydrate, and other inorganic materials. Organic materials can also be employed.

In a typical batch of coating material according to the invention, the three main ingredients include the following approximate weight percentages: silica sand—25 to 45 weight percent of the dry ingredients; filler—10 to 25 weight percent of the dry ingredients; and cement—30 to 55 weight percent of the dry ingredients.

Preferably, the coating of the invention also includes other ingredients, most notably acrylic solids and discrete fiber reinforcement, by such fibers as glass fibers or polypropylene fibers. The acrylic solids are in the form of a polymeric emulsion. An acrylic polymer that can be used successfully with the invention is acrylic latex MC-76, a methylmethacrylate butylacrylate copolymer available from Rohm & Haas Company. The polypropylene fibers are preferably 15 denier and have an average length of about one half inch. These can be obtained from Fiber Mesh Company, Chattanooga, Tenn.

The polypropylene fiber provides a stress control fiber matrix to eliminate cracking during hydration, to resist impact damage and tie the coatings over the fasteners together with the coatings over the insulation board face.

EXAMPLE I

A coating for a wallboard according to the invention would contain the following materials: 25 to 45 weight percent silica sand; 10 to 25 weight percent $CaCO_3$; 0.1 to 0.2 weight percent polypropylene fiber; 3.5 to 5.0 weight percent acrylic solids; and 30–55 weight percent cement. All materials are measured as a percent of dry weight.

EXAMPLE II

Two coatings for a wallboard was made up using the following materials:

| Formulation | Composition A Approx. Weight (%) | Composition B Approx. Weight (%) |
|---|---|---|
| Silica Sand | 42.2 | 28.6 |
| Calcium Carbonate | 21.1 | 13.6 |
| Defoamer | 0.10 | 0.10 |
| Butyl Cellusolve | 0.10 | 0.10 |
| ¼" Polypropylene Fiber | 0.16 | 0.16 |
| Acrylic Polymer | 4.6 | 4.4 |
| Polyacrylate Thickener | 0.6 | 0.6 |
| Biocide | 0.05 | 0.05 |
| Portland Type 1 Cement | 31.6 | 52.4 |

The silica sand had a mean particle size of about 300 microns. The $CaCO_3$ had a mean particle size of about 10 microns. The weight ratio of sand to $CaCO_3$ was 2:1. Composition B is preferred because it uses more low cost cement.

The defoamer is Nopco NXZ, manufactured by Diamond Shamrock. This is one of many non-silicone based defoamers suitable for acrylic based coatings. The coalescing agent, butyl cellusolve, is a monobutyl ester of ethylene glycol, and the applicable concentration range is between 0.05 and 0.30 percent.

A suitable thickener is Acrysol G110, one of the family of polyacrylates suitable for this coating. A concentration range of 0.4 to 1.0 percent is used. This is available from Rohm & Haas.

A suitable biocide is Dowicil 75 manufactured by Dow Chemical. A threshold concentration of 0.05 percent was found acceptable.

The amount of water is variable, depending on the conditions. Additional quantities of water are probably necessary in field mixing of the cement for proper consistency and viscosity of the coating material.

EXAMPLE III

The undercoating of composition B prepared according to Example II was applied to a scrim-faced fiber glass board, which was fastened to wall studs, and this was done without pre-spotting. The coating composition of the invention dried without shrinkage or cracking. This was true even in depressions over the mechanical fasteners. The coating covered the surface irregularities of the board surface. The coating left a strong, but flexible material, suitable for application of an overcoat.

EXAMPLE IV

Three coating compositions were prepared according to the following table with the percentages given as weight percent:

| Material | Composition C | Composition D | Composition E |
|---|---|---|---|
| Cement | 50 | 50 | 33 |
| Sand | 31 | 30.3 | 37 |
| Filler | 0 | 3.4 | 18 |
| Fiber | 0 | 0.4 | 0.14 |
| Polymer | 5 | 5.5 | 4.2 |
| Water | 14 | 10.4 | 9.0 |

Composition C is a commercially available coating material for wallboards. Composition D represents another commercially available coating. Composition E represents the coating of the invention, and is essentially the same as Composition A.

Additional water was added to these materials as needed during application. The materials were applied without pre-spotting over scrim-faced fiber glass wallboards having dimples, seams and grooves. Upon drying, Compositions C and D exhibited cracking and shrinkage, particularly over the depressions associated with mechanical fasteners. Composition E gave good performance in a single coat, with no visible shrinking or cracking.

It will be evident from the foregoing that various modifications can be made to this invention. Such, however, are considered as being within the scope of the invention.

INDUSTRIAL APPLICABILITY

This invention will be found to be useful in coatings for wallboards used in building construction.

We claim:

1. A coating composition for a wallboard comprising silica sand, cement, and a particulate, non-fibrous filler, where the ratio of the average sand diameter to the average filler diameter is within the range of from about 40:1 to about 20:1.

2. The coating composition of claim 1 in which the ratio of the average sand diameter to the average filler diameter is within the range of from about 35:1 to about 25:1.

3. The coating composition of claim 2 in which the volume ratio of sand to filler is within the range of from about 2.25:1 to about 1.75:1.

4. The coating composition of claim 3 in which the silica sand is present to the extent of from about 25 to about 45 weight percent of the dry ingredients, the filler is present to the extent of from about 10 to about 25 weight percent of the dry ingredients, and the cement is present to the extent of from about 30 to about 55 weight percent of the dry ingredients.

5. The coating composition of claim 4 further comprising acrylic solids and polypropylene fibers.

6. The coating composition of claim 5 in which the sand has an average diameter of about 300 microns and the filler has an average diameter of about 10 microns.

7. The coating composition of claim 6 in which the filler comprises $CaCO_3$.

8. A coating composition for a wallboard comprising 25 to 45 weight percent silica sand; 10 to 25 weight percent $CaCO_3$; 0.1 to 0.2 weight percent polypropylene fiber; 3.5 to 5.0 weight percent acrylic solids; and 30–55 weight percent cement; where the ratio of the average sand diameter to the average filler diameter is within the range of from about 40:1 to about 20:1.

9. The coating composition of claim 8 in which the sand to filler diameter ratio is about 30:1.

10. An insulated outer wall construction for a building comprising insulation boards having a scrim secured thereto on the outer side thereof, fastening means mechanically securing the boards and the scrim to the building, and a coat of the coating as claimed in claim 4 covering the boards, scrim and fastening means.

11. The wall construction as claimed in claim 10 further including a non-cementitious overcoat applied over the coating.

12. An insulated outer wall construction for a building comprising insulation boards, fastening means securing the boards to the building, and a cementitious coating covering the boards and fastening means, the coating comprising silica sand, cement and a particulate, non-fibrous filler, where the ratio of the average sand diameter to the average filler diameter is within the range of from about 40:1 to about 20:1.

* * * * *